US009836520B2

(12) United States Patent
Jose et al.

(10) Patent No.: US 9,836,520 B2
(45) Date of Patent: Dec. 5, 2017

(54) SYSTEM AND METHOD FOR AUTOMATICALLY VALIDATING CLASSIFIED DATA OBJECTS

(71) Applicant: International Business Machines Corporation, Armonk, NY (US)

(72) Inventors: Romina M. J. Jose, Waltham, MA (US); Jason D. LaVoie, Littleton, MA (US); Kavita Patil, Westford, MA (US); Aleksandr E. Petrov, Acton, MA (US); Jeffrey R. Pratt, Groton, MA (US); Edward T. Winchester, Billerica, MA (US); Kristin A. Witherspoon, Somerville, MA (US)

(73) Assignee: International Business Machines Corporation, Armonk, NY (US)

( * ) Notice: Subject to any disclaimer, the term of this patent is extended or adjusted under 35 U.S.C. 154(b) by 285 days.

(21) Appl. No.: 14/178,497

(22) Filed: Feb. 12, 2014

(65) Prior Publication Data
US 2015/0227591 A1    Aug. 13, 2015

(51) Int. Cl.
*G06F 7/00*     (2006.01)
*G06F 17/30*    (2006.01)

(52) U.S. Cl.
CPC .............. *G06F 17/30598* (2013.01)

(58) Field of Classification Search
CPC ................................ G06F 17/30598
USPC ........................................ 707/737
See application file for complete search history.

(56) References Cited

U.S. PATENT DOCUMENTS

| | | |
|---|---|---|
| 5,930,788 A | 7/1999 | Wical |
| 6,243,722 B1 | 6/2001 | Day et al. |
| 6,553,365 B1 | 4/2003 | Summerlin et al. |
| 7,478,088 B2 | 1/2009 | Summerlin et al. |
| 7,991,715 B2 | 8/2011 | Schiff et al. |
| 8,140,531 B2 | 3/2012 | Graf et al. |
| 8,140,584 B2 | 3/2012 | Guha |
| 8,180,779 B2 | 5/2012 | Horowitz et al. |
| 8,260,731 B2 | 9/2012 | Maruyama et al. |
| 2005/0002572 A1 | 1/2005 | Saptharishi et al. |
| 2007/0094215 A1* | 4/2007 | Toms ............... G06F 17/30749 706/52 |

(Continued)

OTHER PUBLICATIONS

Z. Song et al., Contextualizing Object Detection and Classification, 2011 IEEE Conference on Computer Vision and Pattern Recognition (CVPR), http://www.lv-nus.org/papers/2011/cvpr2010-context_final.pdf.

(Continued)

*Primary Examiner* — Van Oberly
(74) *Attorney, Agent, or Firm* — Terrile, Cannatti, Chambers & Holland, LLP; Stephen A. Terrile

(57) ABSTRACT

A method, system and computer-usable medium are disclosed for enhancing a classification system to include an automatic classification validation system. The automatic classification validation system takes the classification results and automatically validates them for correctness. More specifically, the automatic classification validation system analyzes the data objects in the categories and, if any outliers are identified, then determines a context of the data object from a plurality of records contained within a certain category to determine the context. The classification validation system then uses the context of the data object to validate the classification.

17 Claims, 4 Drawing Sheets

(56) References Cited

U.S. PATENT DOCUMENTS

2007/0162414 A1* 7/2007 Horowitz ............ G06F 17/3071
2008/0249764 A1 10/2008 Huang et al.
2009/0299946 A1 12/2009 Myrick et al.
2010/0017386 A1 1/2010 Anderson et al.
2010/0169317 A1 7/2010 Wang et al.
2011/0029525 A1 2/2011 Knight
2012/0281907 A1 11/2012 Samples et al.
2014/0314311 A1* 10/2014 Garera ................ G06F 17/3087
382/159

OTHER PUBLICATIONS

H. Cao et al., Context-Aware Query Classification, http://research.microsoft.com/pubs/81350/sigir09.pdf, Jul. 19, 2009.

* cited by examiner

SYSTEM AND METHOD FOR AUTOMATICALLY VALIDATING CLASSIFIED DATA OBJECTS

BACKGROUND OF THE INVENTION

Field of the Invention

The present invention relates in general to the field of computers and similar technologies, and in particular to software utilized in this field. Still more particularly, it relates to a method, system and computer-usable medium for automatically validating classified data objects.

Description of the Related Art

Systems often contain large volumes of data objects that need to be classified using taxonomies that in their turn can have tens or hundreds of thousands of categories. Known systems classify the content of data objects, however, it is difficult to validate that the classifications are correct. With known systems, validating that the classifications are correct is largely a manual process that is very time consuming and difficult.

For example, when a data system contains large volumes of data objects, it is desirable to classify the data objects based on their content. The data system may include a classification system through which the data objects are processed. Known classification systems include a plurality of categories and when processing the data objects, divide the data object into the various categories based on the content of the data object. However, one challenge associated with classification systems is validating whether a certain classification of a data object is correct. With many known classification systems, the process of validating whether a certain classification is correct is performed manually.

SUMMARY OF THE INVENTION

In one aspect the invention relates to a computer-implemented method for enhancing a classification operation, comprising performing a classification validation operation on a plurality of classified data objects, the classification validation operation automatically validating whether each of the plurality of classified data objects were correctly classified.

In another aspect, the invention relates to a system comprising: a processor; a data bus coupled to the processor; and a computer-usable medium embodying computer program code, the computer-usable medium being coupled to the data bus. The computer program code is used for enhancing a classification operation and comprises instructions executable by the processor and configured for performing a classification validation operation on a plurality of classified data objects, the classification validation operation automatically validating whether each of the plurality of classified data objects were correctly classified.

In another aspect, the invention relates to a non-transitory, computer-readable storage medium embodying computer program code. The computer program code comprising computer executable instructions configured for performing a classification validation operation on a plurality of classified data objects, the classification validation operation automatically validating whether each of the plurality of classified data objects were correctly classified.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
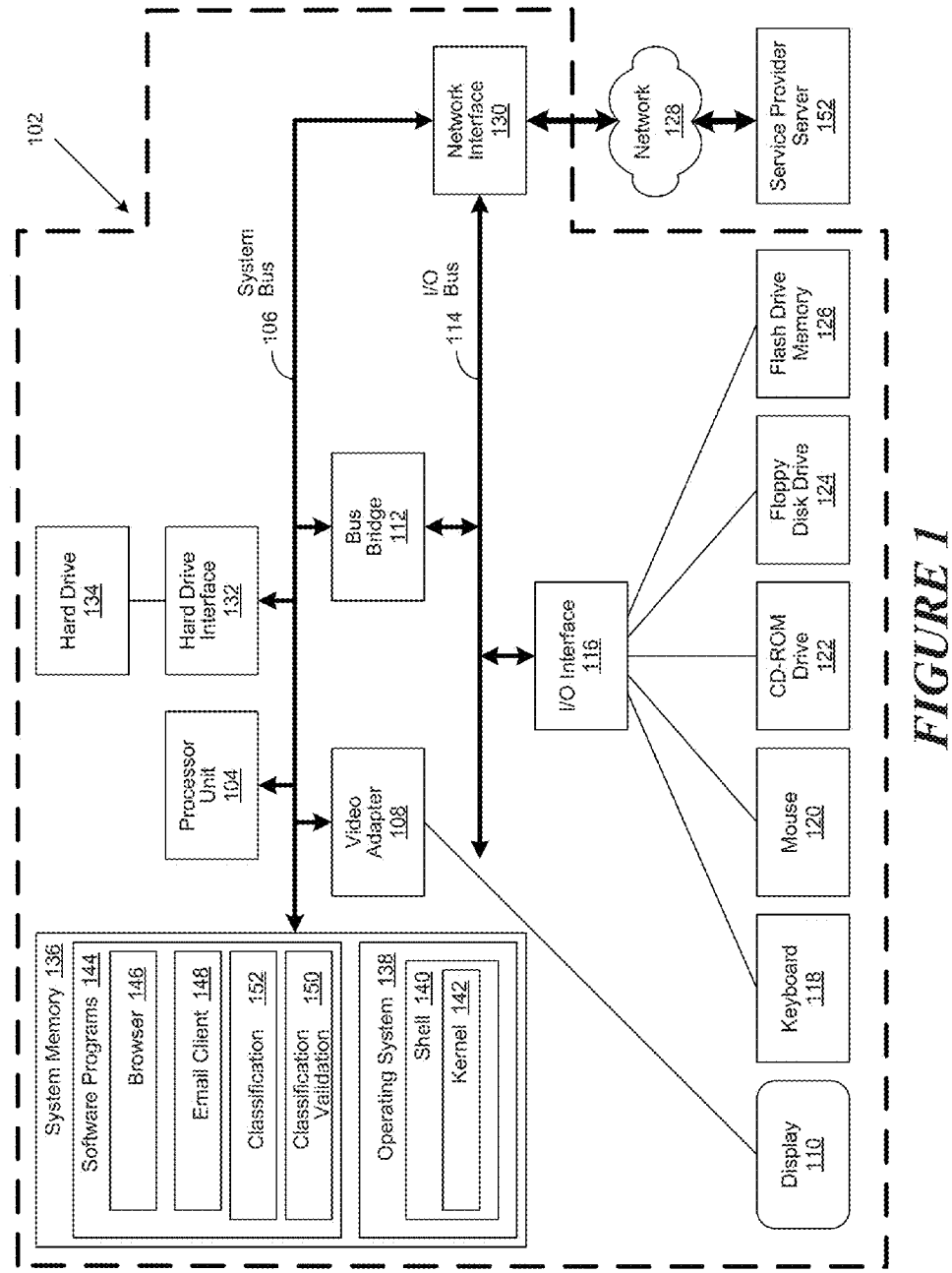
FIG. 1 shows an exemplary client computer in which the present invention may be implemented.

A method, system and computer-usable medium are disclosed for enhancing a classification system to include an automatic classification validation system. The automatic classification validation system takes the classification results and automatically validates them for correctness. More specifically, the automatic classification validation system identifies outliers which are likely to require reclassification and for categories which include outliers, the automatic classification validation system analyzes the data objects in those categories and then determines a context of the data object from a plurality of records contained within a certain category. The classification validation system then uses the context of the data object to validate the classification.

More specifically, in operation for a batch of data objects being classified, the batch of data objects is loaded into the classification system. The classification system then assigns a category to each data object based on the content of the data object. After the data objects are grouped into various categories, the data objects in each category are automatically validated for correctness based upon the context of the data object.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (fir example, through the Internet using an Internet Service Provider).

Embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a block diagram of an exemplary client computer 102 in which the present invention may be utilized. Client computer 102 includes a processor unit 104 that is coupled to a system bus 106. A video adapter 108, which controls a display 110, is also coupled to system bus 106. System bus 106 is coupled via a bus bridge 112 to an Input/Output (I/O) bus 114. An I/O interface 116 is coupled to I/O bus 114. The I/O interface 116 affords communication with various I/O devices, including a keyboard 118, a mouse 120, a Compact Disk-Read Only Memory (CD-ROM) drive 122, a floppy disk drive 124, and a flash drive memory 126. The format of the ports connected to I/O interface 116 may be any known to those skilled in the art of computer architecture, including but not limited to Universal Serial Bus (USB) ports.

Client computer 102 is able to communicate with a service provider server 152 via a network 128 using a network interface 130, which is coupled to system bus 106. Network 128 may be an external network such as the Internet, or an internal network such as an Ethernet Network or a Virtual Private Network (VPN). Using network 128, client computer 102 is able to use the present invention to access service provider server 152.

A hard drive interface 132 is also coupled to system bus 106. Hard drive interface 132 interfaces with a hard drive 134. In a preferred embodiment, hard drive 134 populates a system memory 136, which is also coupled to system bus 106. Data that populates system memory 136 includes the client computer's 102 operating system (OS) 138 and software programs 144.

OS 138 includes a shell 140 for providing transparent user access to resources such as software programs 144. Generally, shell 140 is a program that provides an interpreter and an interface between the user and the operating system. More specifically, shell 140 executes commands that are entered into a command line user interface or from a file. Thus, shell 140 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. While shell 140 generally is a text-based, line-oriented user interface, the present invention can also support other user interface modes, such as graphical, voice, gestural, etc.

As depicted, OS 138 also includes kernel 142, which includes lower levels of functionality for OS 138, including essential services required by other parts of OS 138 and software programs 144, including memory management, process and task management, disk management, and mouse and keyboard management. Software programs 144 may include a browser 146 and email client 148. Browser 146 includes program modules and instructions enabling a World Wide Web (WWW) client (i.e., client computer 102) to send and receive network messages to the Internet using Hyper-Text Transfer Protocol (HTTP) messaging, thus enabling communication with service provider server 152. In various embodiments, software programs 144 may also include a classification validation system 150 as well as a classification system 152. In these and other embodiments, the classification validation system 150 includes code for implementing the processes described hereinbelow. In one embodiment, client computer 102 is able to download the classification validation system 150 from a service provider server 152.

The hardware elements depicted in client computer 102 are not intended to be exhaustive, but rather are representative to highlight components used by the present invention. For instance, client computer 102 may include alternate memory storage devices such as magnetic cassettes, Digital Versatile Disks (DVDs), Bernoulli cartridges, and the like. These and other variations are intended to be within the spirit, scope and intent of the present invention.

The classification system 152 classifies data objects into different categories. These categories are pre-defined such as category A, category B, category C, and so on, such that several different data objects may be classified as belonging to category A, category B or category C. For each data object in each category, the classification validation system 150 determines whether that the data object has been correctly categorized. The automatic classification validation system 150 validates the data objects that were classified by the classification system and validates that the data objects were classified correctly. Additionally, the classification validation system 150 automatically augments the context of the classified objects and provides this augmented context when performing a reclassification of the misclassified data objects.

Figure 2:
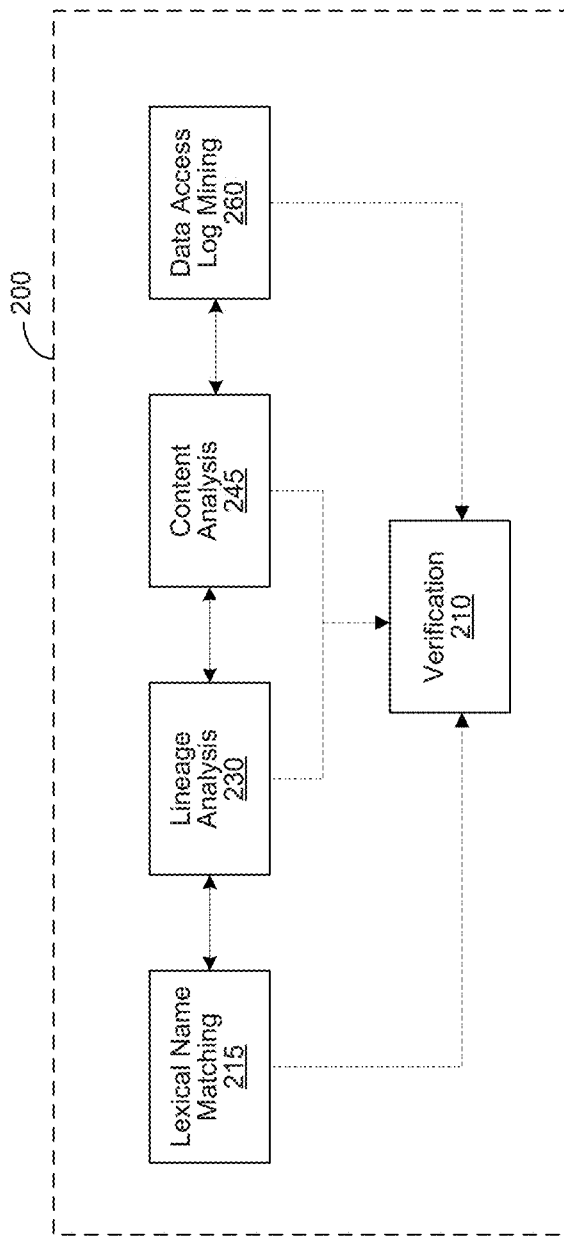
FIG. 2 shows a block diagram of a classification system.

FIG. 2 shows a block diagram of one example of a classification system 200 (which in certain embodiments corresponds to classification system 152) in which the automatic classification validation system 150 may be used. The classification system 200 is configured to automate relational data discovery, perform algorithmically-controlled mappings of existing database schemas, and pre-label corresponding data assets with a corresponding term. Using the classification system 200 results in a normalized labeling of relational data across an enterprise.

The classification system 200 includes a lexical name matching component 215, a lineage analysis component 230; a content analysis component 245; and a data access log mining process component 260. The classification 200 also includes a classification validation component 270 (which in certain embodiments corresponds to classification validation system 150).

The lexical name matching component 215 automatically suggests one or more labels for an item. More specifically, the lexical name matching component 215 scans data items and determines what name is assigned to the data item. For example, when finding a table the lexical name matching component 215 looks at the table name and when finding a column the lexical name matching component 215 looks at the column name. This may be done by analyzing metadata or other methods known to those skilled in the art. The lexical name matching component 215 then compares the name to normalized labels within the defined taxonomies and then goes through all of the labels in all of the taxonomies. If a label appears in the name then the label is added to the list of suggested labels for the item. The lexical name matching component 215 can then continue to scan other items.

If the scanned name does not include a label that is already in a taxonomy, then the lexical name matching component 215 compares the name to lists of synonyms. Embodiments can allow each label in a taxonomy to have a list of synonyms. The lexical name matching component 215 can go through all of the synonyms associated with each of the labels in every taxonomies. If a synonym appears in the name then the corresponding label is added to the list of suggested labels for this item.

For example, the lexical name matching component 215 can scan data and determine the name used to describe the data is "Name_First". Upon comparing the name "Name_First" to the labels within a taxonomy, the lexical name matching component 215 can determine that the name "Name_First" does not contain any labels. Therefore, the lexical name matching component 215 would compare the "Name_First" name to lists of synonyms that may be used instead of the normalized labels. The list for the label "First Name" may contain, for example: "FN", "F_Name", "Name_F", "Name_First", "FirstName", "First_N", "GivenName", etc. If the lexical name matching component 215 finds the synonym "Name_First" within the list, then the lexical name matching component 215 can determine that the label "First Name" is a good candidate for labeling the data item with the name "Name_First", and automatically add the label to the list of suggested labels. A data item can have as many labels as necessary to describe it fully.

However, if the name does not contain any synonym, then the lexical name matching component 215 may not make any label suggestions and it is left to the classification validation component 270 to determine what normalized label should be given to the data. Embodiments may also allow the name to be added to a list of synonyms, either automatically via the classification validation component 270 or manually by a user, so that future instances of the name will automatically be mapped to suggested labels.

Other categorization components may be used in addition to or instead of the lexical name matching component 215. For example, a lineage analysis component 230 looks at data movement operations (i.e., where data originates) to determine if data in one or more locations is the same. If the data is determined to be the same, only in different locations, then the lineage analysis component 230 assigns the same normalized label to all instances of the data. If the lineage analysis component 230 is unsure as to whether data is the same, then the classification validation component 270 may be used to confirm or reject a proposed normalized label. If the normalized label is accepted, then the normalized label may automatically be associated with other instances where the data has undergone the same movement operation.

For example, the lineage analysis component 230 can use information about an extract, transform, load (ETL) data movement operation. ETL can be used by a company that has multiple systems, where the company needs to integrate data between the systems (e.g., update customer credit card information between company databases). While ETL is used as an example, one skilled in the art should recognize that information about any number of data movement components may be used by the lineage analysis component 230 to automatically label structured data. Typically ETL may be performed every night, or according to some other predetermined interval, and may include a series of steps wherein data is extracted from outside sources, transformed to fit certain requirements, and loaded into the end target. When this component is configured, the data movement can be tracked and information about it stored in a central registry which may be included within the system memory 136. Since the movement of data from one place to another is tracked, the data in both locations can be assumed to be the same type of data. Accordingly, the same normalized labels can be automatically assigned to both sets of data.

The content analysis component 245 can be used to determine whether certain data, without a normalized label, contains the same type of content as other data, which may have a normalized label. If the content is the same then the normalized label may be assigned to both instances of the data. If it is unclear whether the content is the same, i.e., whether the same label from within the taxonomy should be applied to the data, then the classification validation component 270 may be used to determine whether the normalized label should be applied.

The content analysis component 245 may be performed in a number of ways. Embodiments may perform the content analysis by first scanning columns of data to determine what values are in the column. Next, tables and/or columns may systematically be scanned to determine if the data in the tables and/or columns is similar to the originally scanned columns. For example, if social security numbers are stored according to a certain format (e.g., ###-##-####) then a scan may find tables and/or columns having numerical data stored in a similar format. If the data is similar, then the content analysis component 245 may be used to determine if either column of data is assigned a normalized label.

If a normalized label is already associated with a column, then the normalized label can be assigned to the other column. However, if it is unclear whether the data content is the same, or if neither column has a normalized label, then the classification validation component 270 may determine what normalized label should be assigned to the data. Alternatively, if neither column has a normalized label then any number of other components within the classification system 200, such as a lexical name matching component 215, lineage analysis component 230, and/or data access log mining component 260, may be used to suggest and/or assign normalized labels.

The data access log mining component 260 may also be used to automatically label data. The data access log mining component 260 determines what type of data a certain group of users, having a certain role, are accessing by analyzing access logs that are written by databases and/or applications. Most databases and/or applications can be configured to write a log entry each time a user accesses a data item. The entry can contain the identity of the user and the location of the data. This information is joined in a central location, which can then be used for data analysis. The central location may be contained within the system memory 136.

The data access log mining component 260 may be configured to operate in many ways depending on the embodiment. For example, embodiments may first configure the databases and/or applications to write logs and join the logs in a central location. Next, for a particular group of users with the same job role, the data access log mining component 260 can be used to analyze the joined logs to determine what data is frequently being accessed. Based on this information, the data access log mining component 260 can assign a normalized label to data, or suggest one or more normalized labels to be used by the classification validation component 270.

For example, it may be determined that a group of users work in the payroll department of a company. Based on this information, it can be expected that the group of users should frequently be accessing data related to employee salaries. Therefore, the data access log mining component 260 may analyze the group's activity to find what data the group frequently accesses. Once determined, the data access log mining component 260 may automatically assign a normalized label representing employee salary to the most frequently accessed data. Alternatively, the data access log mining component 260 may present possible normalized labels to the classification validation component 270 and ask classification validation component to confirm or suggest a normalized label to be assigned to the data.

The classification validation component 270 can be used in embodiments as a backup to confirm or reject the classification system's 200 classification or labeling of data. The classification validation component 270 may also include any number of learning algorithms designed to passively analyze responses. Based on the responses, the learning algorithm may make suggestions based on the past responses in the classification validation component 270. Depending on the learning algorithm, the algorithm may eventually be used to automatically classify and validate data.

Figure 3:
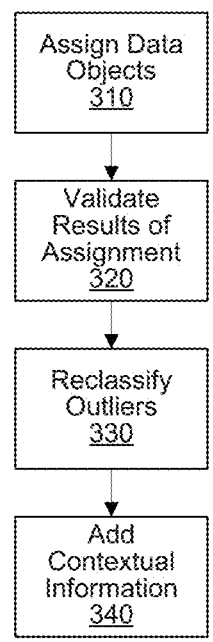
FIG. 3 shows a generalized flowchart of the operation of a classification validation operation.

FIG. 3 shows a flow chart of the operation of the classification validation system 150. More specifically, the classification validation system 150 begins operation by assigning the data objects to different categories at step 310. In various embodiments, assigning data objects to different categories (i.e., the classification of the data objections) can be performed on huge amounts of data (e.g., millions of records and/or terabytes of data). When classifying large amounts of data quickly it is difficult for the classification system 200 to perform a deep dive operation into the context of each data object. This is why misclassifications can occur. Thus, the classification validation system 150 is provided to automatically performs a deep dive operation into the context of any misclassified data objects. Such a classification validation system 150 is becoming even more desirable as big data becomes more and more important. When a classification system 200 is used to classify huge amounts of data, it is important that a classification validation operation be performed, and more importantly, that it is automated, because the cost manually validating misclassified data can be huge. Even if classification systems can be improved, it is still important to have automated validation to verify that the resulting classification is correct. Misclassified data skews the real data picture of the data that are being classified Next at step 320, the classification validation system 150 validates the results of the category assignment. For any results that are identified as outliers, the classification reclassifies these outliers at step 330. Outliers are identified for each category. In certain embodiments, the outliers are identified using a similarity matrix or black and white lists. Additionally, in certain embodiments, a context of each outlier is identified. In certain embodiments, the context of each outlier may be determined using known techniques in the art, such as regular expressions. The original data objects provide the source of input in determining context.

In various embodiments, identification of outliers is performed using one or more of a plurality of operations. For example, the plurality of operations may include use of a similarity matrix operation, a black and/or whitelist operation, and an anomaly detection operation. More specifically, in certain embodiments, a similarity matrix may be generated for each category to determine whether a data object has been classified correctly. When using a similarity matrix operation, a similarity value (e.g., a similarity measure) is calculated for each data object against all other data objects in a given category to determine the elements of the similarity matrix. In various embodiments, one or more of a plurality of similarity measures may be used, e.g. a cosine similarity measure or a Levenshtein distance measure. With a cosine similarity measure a vector of attributes for each data object is calculated and the cosine of the angle between tails of each vector of attributes is calculated. The angles calculated are then compared to a given threshold to determine outliers. Given a pre-defined threshold, a data object whose similarity measure is outside of this threshold is considered to be an outlier. When using a black and/or whitelist operation, a whitelist contains a list of objects that are identified as belonging to a particular category, while a blacklist contains a list of objects that are identified as being excluded from a particular category. For example, a whitelist may exist for objects recognized as "medical devices" such that those objects which do not belong to this list, e.g. plunger, are automatically identified as being outliers. When using an anomaly detection operation, an anomaly (e.g., outlier) detection module identifies objects which do not follow a predefined pattern, e.g. unusual transactions in a banking system. Those objects identified as outliers by anomaly detection module are considered as candidates for further analysis in a classification validation system. Additionally, in certain embodiments, how different a data object need to be to be considered an outlier can be customized based on the sensitivity of the outlier detection operation.

In various embodiments, the context of each outlier as well as the context of all other data objects in the category from which the outlier came is determined. The detection of outliers is one component of the classification validation system. In certain embodiments, substantially each and every outlier identified is taken for further analysis by determining the context of the outlier. Enriching the outlier by determining context is an important advantage of the classification validation system 150. While the classification system 200 performs classification based on a particular set of features, the performance of a particular classification system depends on the features of the data that is used to classify data objects. The result of a classification system 200 that has classified millions of data objects into many different categories based on a particular set of features is likely to produce misclassified data objects. The classification validation system 150 first identifies misclassified data objects for each category, i.e. the outliers. Having identified the outlier data objects, the context of these outlier data objects is determined to improve their classification. One goal of the classification validation system 150 not to add context information for data objects during the initial classification phase but to add context to identified outliers during a validation phase so as not to add additional computational burden on a classification system.

Context information may be defined as extra supportive information or additional features for a data object which is collected independently from the classification process. Data object classification may be improved by using context information. The context information may be external context or may be information from the outlier data object itself.

More specifically, in certain embodiments, context for an outlier data object that may be determined from the data object itself may be determined from the data store from which the outlier data object originated, e.g. transactional data. Context from external context may be determined using an artificial intelligence type data processing system (such as the Watson system available from International Business Machines, Inc) Context may also be determined from the objects in each category, e.g. using reference resolution to determine to what the data objects in a category refer. To avoid using context information inappropriately, the context information may be integrated adaptively depending on how the classification system is being used. For example, for unstructured data, finding context information using an artificial intelligence data processing system will be beneficial. For security purposes, e.g. using data like social security numbers, context may be determined using regular expressions. For images, e.g. pictures taken using a digital camera, context may be derived from metadata, e.g. geo-tags. The original outlier data object features are augmented with the context features and provided into a classification system (which may or may not be the classification system 200) which uses this particular set of augmented features to classify data objects. The use of original features augmented with context information improves the classification of outlier data objects. The classification system used to initially classify the data objects need not be the same system used for reclassifying outliers as the features used may be different.

Alternatively, in certain embodiments, the context from the other data objects in a category need not be determined but rather a context is determined from the original data store for the outlier, e.g. from transactional data. In various embodiments, a plurality of approaches may used for identifying informational elements for determining context, for example using regular expressions or reference resolution. An example of using regular expressions is extracting phone numbers, addresses, or social security numbers from text fields. Alternately, context using regular expressions may be used. For text, a reference resolution operation may be used. For example when performing a reference resolution operation, when given a certain category, the operation reviews each classified entry in each category to determine to where the entry refers and to determine to what the outlier refers, e.g. the outlier "chicken from Hillside Farms". Using an operation to determine context by determining to what each entry refers, the operation can determine if other entries in a specific category refer to the same context, e.g. "live chickens" and also determine to what the outlier refers, e.g. "farms". The outlier's context, in this case, is "farm". Given the context, the system determines whether the outlier should be kept or reclassified (enriched with context prior to reclassification).

The outliers that are identified as being misclassified are submitted for reclassification. At step 340, the classification validation system 150 adds the contextual information for the misclassified data objects, and automatically sends outliers in each category to the classification system to be reclassified using the associated context. In certain embodiments, a classification system which is different from the original classification system may be used when reclassifying outliers. Outliers have a high likelihood of being classified correctly during the reclassification phase because when performing the reclassification, the classification validation system 150 uses the context of the data object to augment the information that is used to determine into which category a data object should be classified. For example, a classification system may classify invoices based on a parts field in a database (which may be just one field of a large invoice). However, for misclassified data objects, the classification validation system may look to other fields within the invoice (i.e., to obtain additional context) to correctly classify the misclassified invoice. For example, when performing the reclassification, the classification validation system 150 could supplement the information derived from the parts field with additional details from a description field or with additional information from a department field Accordingly, the classification validation system 150 verifies the correctness of the classification of the data objects. The correctness is verified by using a similarity matrix or black and white lists to find outliers and by analyzing the context in which the data is found. Additionally, the classification validation system 150 automatically identifies misclassified data objects in a category. Results that are identified as being misclassified are removed from the erroneous classification. Additionally, the classification validation system 150 automatically submits misclassified data objects for reclassification. The misclassified data objects are then automatically reclassified in valid categories.

For example, in one operation when performing a classification validation operation, a pre-defined category may be determined from a public database (such as the United Nations Standard Products and Services Code database). For example:

10100000 Live animals
    10101500 Livestock
    10101501 Cats
    10101502 Dogs
    10101600 Birds and fowl
    10101601 Live chickens
    10101602 Live ducks Several data objects that a classification system 152 needs to categorize may be classified into any one of a pre-determined set of categories. The classification system 152 may use data object names, for example "chicken from Hillside Farms," to determine which category the data object belongs to and this may be the only information that is required. If the classification taxonomy we were using included both a "Live chickens" category and a "farm" category, the object "chicken from Hillside Farms" may be misclassified.

The automatic classification validation system 150 checks the names of the data objects in each category against all other data object names in the category to determine similarities between each data object. Thus in certain embodiments, the classification validation system 150 includes a matrix of similarity measures for each data object against another in each category. The data objects with similarity measures that are below a certain threshold then become candidates for re-classification.

Additionally, the automatic classification validation system 152 validates the correctness of data objects in a category by using a black or white list. The lists are used to determine whether a particular data object is misclassified in a particular category. All data objects that are identified as outliers become candidates for re-classification.

Figure 4:
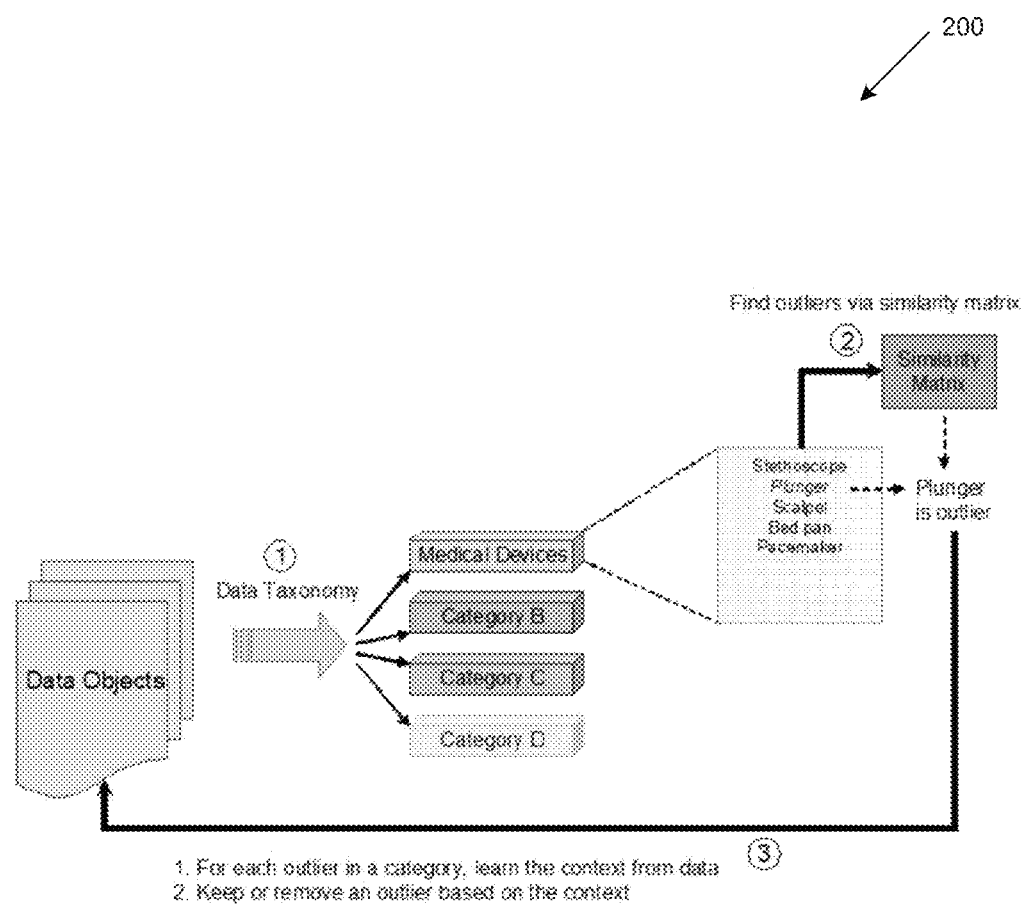
FIG. 4 shows a block diagram of an example classification operation.

Referring to FIG. 4, a block diagram of an example classification operation is shown. More specifically, in the example of FIG. 4, data objects from a hospital are being analyzed and classified. The data objects may include for example a hospital bed inventory, patient opinions on their stay, and hospital network traffic. One of the classifications created by the classification system is Medical Devices. Within this classification the items listed are: stethoscope, plunger, scalpel, bed pan. The piece of data that is incorrectly classified is the plunger. This invalid classification (i.e., this outlier) should be identified and the classification of this item should adjusted by removing plunger, and the data object (plunger) reclassified.

In the example shown in FIG. 4, the original classification categories include one called "medical devices". The data objects are analyzed and any that are medical devices are categorized in the "Medical Device" category. In the example, our system validates all the medical devices by using a similarity matrix. In one example, the outliers are identified using a white list. Accordingly, the classification validation system 150 would include a white list of all medical devices that a company has in its inventory. Because a plunger is not included in the white list of medical devices, the plunger is identified as an outlier.

The classification validation system then uses a deep question answer (QA) system such as an artificial intelligence data processing system to analyze the data object (e.g., the plunger) and examine context information of the data object to determine context. So for example, the context information for the data object may include a sales invoice about a plunger identifying the plunger as being obtained from a plumbing supplier (as compared to a medical device supplier), the classification validation system 150 would the send the plunger data object to be automatically reclassified with more context such as "plunger, plumbing, bathroom equipment" and with this additional information, the plunger is reclassified into a new category such as "Maintenance supplies."

Additionally, when performing using the deep QA system, natural language processing (NLP) may be used to identify other key words and phrases in the invoice. The classification validation system 150 can then generate a new string (such as "plunger, maintenance, bathroom equipment") that is provided to a classification system 200 so that the data object can be classified correctly.

Although the present invention has been described in detail, it should be understood that various changes, substitutions and alterations can be made hereto without departing from the spirit and scope of the invention as defined by the appended claims.

What is claimed is:

1. A computer-implemented method for enhancing a classification operation, comprising:
performing a classification operation on a plurality of data objects to provide a plurality of classified data objects;
performing a classification validation operation on the plurality of classified data objects, the classification validation operation automatically validating whether each of the plurality of classified data objects were correctly classified, the classification validation operation automatically identifying outliers, the outliers corresponding to data objects which are likely to require reclassification, the automatically identifying outliers being performed using a similarity matrix operation, the similarity matrix operation making use of a plurality of similarity matrices, each of the plurality of similarity matrices corresponding to a given category of data objects;
identifying misclassified data objects based upon the classification validation operation;
performing a reclassification operation on the misclassified data objects, the reclassification operation using information derived from the classification validation operation to correctly classify the misclassified data objects; and wherein
the similarity matrix operation comprises calculating a similarity value for each data object against all other data objects in a given category to determine elements of the similarity matrix; and,
a similarity measure is used to generate the similarity value for the plurality of data objects, the similarity measure comprising at least one of a cosine similarity measure and a Levenshtein distance measure.

2. The method of claim 1, wherein:
the classification validation operation analyzes the plurality of classified data objects based upon classification categories and then determines a context of each data object from a plurality of records contained within a certain category.

3. The method of claim 2, wherein:
the classification validation operation then uses the context of the data object to validate the classification.

4. The method of claim 1, wherein:
the classification validation operation automatically provides outliers in each category to the classification system to be reclassified using context associated with the outliers.

5. The method of claim 1, wherein:
during a classification operation a category is assigned to each data object based on content of the data object.

6. A system comprising:
a processor;
a data bus coupled to the processor; and
a non-transitory computer-usable medium embodying computer program code, the computer-usable medium being coupled to the data bus, the computer program code used for enhancing a classification operation and comprising instructions executable by the processor and configured for:
performing a classification operation on a plurality of data objects to provide a plurality of classified data objects;
performing a classification validation operation on a plurality of classified data objects, the classification validation operation automatically validating whether each of the plurality of classified data objects were correctly classified, the classification validation operation automatically identifying outliers, the outliers corresponding to data objects which are likely to require reclassification, the automatically identifying outliers being performed using a similarity matrix operation, the similarity matrix operation making use of a plurality of similarity matrices, each of the plurality of similarity matrices corresponding to a given category of data objects;

identifying misclassified data objects based upon the classification validation operation;

performing a reclassification operation on the misclassified data objects, the reclassification operation using information derived from the classification validation operation to correctly classify the misclassified data objects; and wherein the similarity matrix operation comprises calculating a similarity value for each data object against all other data objects in a given category to determine elements of the similarity matrix; and, a similarity measure is used to generate the similarity value for the plurality of data objects, the similarity measure comprising at least one of a cosine similarity measure and a Levenshtein distance measure.

7. The system of claim 6, wherein:
the classification validation operation analyzes the plurality of classified data objects based upon classification categories and then determines a context of each data object from a plurality of records contained within a certain category.

8. The system of claim 7, wherein:
the classification validation operation then uses the context of the data object to validate the classification.

9. The system of claim 6, wherein:
the classification validation operation automatically provides outliers in each category to the classification system to be reclassified using context associated with the outliers.

10. The system of claim 6, wherein:
during a classification operation a category is assigned to each data object based on content of the data object.

11. A non-transitory, computer-readable storage medium embodying computer program code, the computer program code comprising computer executable instructions configured for:

performing a classification operation on a plurality of data objects to provide a plurality of classified data objects;

performing a classification validation operation on a plurality of classified data objects, the classification validation operation automatically validating whether each of the plurality of classified data objects were correctly classified, the classification validation operation automatically identifying outliers, the outliers corresponding to data objects which are likely to require reclassification, the automatically identifying outliers being performed using a similarity matrix operation, the similarity matrix operation making use of a plurality of similarity matrices, each of the plurality of similarity matrices corresponding to a given category of data objects;

identifying misclassified data objects based upon the classification validation operation;

performing a reclassification operation on the misclassified data objects, the reclassification operation using information derived from the classification validation operation to correctly classify the misclassified data objects; and wherein the similarity matrix operation comprises calculating a similarity value for each data object against all other data objects in a given category to determine elements of the similarity matrix; and, a similarity measure is used to generate the similarity value for the plurality of data objects, the similarity measure comprising at least one of a cosine similarity measure and a Levenshtein distance measure.

12. The non-transitory, computer-readable storage medium of claim 11, wherein:
the classification validation operation analyzes the plurality of classified data objects based upon classification categories and then determines a context of each data object from a plurality of records contained within a certain category.

13. The non-transitory, computer-readable storage medium system of claim 12, wherein:
the classification validation operation then uses the context of the data object to validate the classification.

14. The non-transitory, computer-readable storage medium system of claim 11, wherein:
the classification validation operation automatically provides outliers in each category to the classification system to be reclassified using context associated with the outliers.

15. The non-transitory, computer-readable storage medium system of claim 11, wherein:
during a classification operation a category is assigned to each data object based on content of the data object.

16. The non-transitory, computer-readable storage medium of claim 11, wherein the computer executable instructions are deployable to a client system from a server system at a remote location.

17. The non-transitory, computer-readable storage medium of claim 11, wherein the computer executable instructions are provided by a service provider to a user on an on-demand basis.

* * * * *